(12) United States Patent
Gelinas

(10) Patent No.: US 7,233,258 B1
(45) Date of Patent: Jun. 19, 2007

(54) LED MATRIX CURRENT CONTROL

(75) Inventor: Reynaid Gelinas, Ile-Perrot (CA)

(73) Assignee: GELcore LLC, Valley View, OH (US)

( * ) Notice: Subject to any disclaimer, the term of this patent is extended or adjusted under 35 U.S.C. 154(b) by 38 days.

(21) Appl. No.: 10/823,180

(22) Filed: Apr. 13, 2004

(51) Int. Cl.
- *G08G 1/095* (2006.01)
- *G08B 5/22* (2006.01)
- *G09G 9/33* (2006.01)

(52) U.S. Cl. .................. 340/907; 340/815.45

(58) Field of Classification Search ............ 315/209 R, 315/219, 291, 307, 308; 340/508, 907, 815.45
See application file for complete search history.

(56) References Cited

U.S. PATENT DOCUMENTS

| | | | | |
|---|---|---|---|---|
| 3,921,035 | A * | 11/1975 | Holmes | 315/307 |
| 3,946,364 | A * | 3/1976 | Codomo et al. | 701/3 |
| 6,127,784 | A * | 10/2000 | Grossman et al. | 315/159 |
| 6,340,870 | B1 * | 1/2002 | Yamashita et al. | 315/308 |
| 6,400,102 | B1 * | 6/2002 | Ghanem | 315/291 |
| 6,614,358 | B1 * | 9/2003 | Hutchison et al. | 340/815.45 |
| 6,683,419 | B2 * | 1/2004 | Kriparos | 315/224 |
| 6,864,641 | B2 * | 3/2005 | Dygert | 315/216 |
| 6,958,580 | B2 * | 10/2005 | Kamoi et al. | 315/291 |

* cited by examiner

*Primary Examiner*—Daniel Wu
*Assistant Examiner*—Jennifer Mehmood
(74) *Attorney, Agent, or Firm*—Fay Sharpe LLP

(57) ABSTRACT

A system is employed to provide a substantially constant intensity light source via functional circuitry, the functional circuitry comprises a switching power supply. At least one signal is part of a matrix of LEDs connected in series and parallel and configured for redundancy. A monitoring circuit comprises a current sense circuit, wherein the current sense circuit includes an amplifier and at least one resistor in series with the amplifier. The current sense circuit includes a power converter circuit that senses a current of a flyback diode, recovers a dc component of a waveform via a low pass filter, and provides feedback control of the at least one signal.

13 Claims, 8 Drawing Sheets

LED MATRIX CURRENT CONTROL

BACKGROUND OF THE INVENTION

1. Field of the Invention

The present invention relates to a temperature dependent current sense circuit for a substantially constant intensity light source. Specifically, the present invention relates to a current sense circuit for a LED matrix for use in signal lights such as traffic lights.

2. Description of the Prior Art

The light-emitting diode (LED) produces light when a forward current flows thru its P-N junction. The intensity of the emitted light is directly proportional to the forward current, $I_F$, and is maintained constant by regulating $I_F$. Changing $I_F$ according to the temperature profile of the LED performs thermal compensation of the light intensity.

The light-emitting diode (LED) can be driven by a constant voltage, $V_F$, to get the desired forward current, $I_F$, or to regulate directly $I_F$. The non-linear electrical characteristic of $I_F/V_F$ has a logarithmic profile. Regulating $I_F$ by using the voltage driven method will result to non-linear variations of $I_F$ for any variations of $V_F$, such as initial, temperature and aging variations. Regulating directly $I_F$ overcomes the non-linearity mentioned above and this is the selected method used in the prior art. Thermal compensation is performed at the level of $R_S$, see FIG. 2, i.e. the equivalent resistance value $R_S$ is the result of the combination of a thermistor in parallel with a resistor and in series with another resistor. The selection of these components' value determines the required thermal profile of the LED lamp.

As shown in FIG. 2, the conventional LED current sense circuit has been used for 5 mm LED lamps. The LED array (not shown in FIG. 2) is fed via J1 and the lamp current returns back to the power transformer through the current sense resistor, $R_S$. The controller CTL drives Q1 in such a way that the voltage at pin 1 of CTL is maintained at 2.5V (+2.5V internal reference). In steady state, the voltage across $R_S$ is 2.5 $V_{dc}$ and the current flowing through it is determined by its resistance value. In the example of FIG. 2, the resistance value of $R_S$ is 25 ohms and the lamp current is regulated to 100 mA. The power dissipation in the sense resistor $R_S$, as shown in FIG. 3, is 0.25 W (100 mA through 25 ohms).

For a 1 W LED applications, the load current that must be sensed is in the order of 1A and the power dissipation of $R_S$ would be 2.5 W thus reducing the efficiency of the power supply. One way to reduce the power loss is to reduce the current sense resistance and to amplify the sensed voltage, as shown in FIG. 3. Using the resistor value of $R_1$ and $R_2$, for 1A load, the Op Amp gain is 38.5 (Gain=2.5V/0.065V or Gain=1+$R_1/R_2$) and the power dissipation is only 65 mW ($P_{diss}$=0.065*$1^2$).

In addition to the constant light intensity requirement of Traffic Light units, power factor control (PFC) must be incorporated. Insertion of the integrated power factor controller circuit in an electrical power supply system enables easy and efficient control of the power factor and level of current harmonics. To obtain a power factor equal to unity, prior art systems use controllers such as controller MC33262 from Motorola. The controller draws current from the ac source in proportion to the sinusoidal voltage. This automatically causes the current waveform to be sinusoidal and in phase with the line voltage waveform. But a PFC circuit has the drawback of having voltage ripple across the output filter capacitor at twice the line frequency. A certain amount of that voltage ripple appears across the current sense resistor and pin 1 of CTL. In the case that the voltage at pin 1 of CTL exceeds 2.7 volt, CTL stops driving Q1 and distortion of the line current waveforms occurs thus increasing the ATHD (Line current Total Harmonic Distortion). The selection of the output filter capacitor value of C7 is thus very critical. Any reduction of the capacitor value due to the initial tolerance and temperature can lead to the scenario mentioned above under some load conditions. An extra pole (R3, C3) is also required to attenuate the 120 Hz ripple to maintain the peak voltage of CTL-1 below 2.7V. Moreover, in order to accommodate different loads, the resistance of R3 must be selected which is not a good practice for a high volume production. Further, the additional pole adds more phase shift at the crossover frequency of the feedback loop and may lead to instability.

A fixed LED output current presents the following drawbacks: at higher temperature the output LED light intensity decreases; at lower temperature the output LED light intensity increases. One object of the present invention is to thermally regulate the output current, and thus the light intensity, of a non-linear high-power light-emitting load.

Secondly, prior art is very sensitive to the output capacitor variations that can lead to increase the ATHD and another object is to eliminate the concern associated to these variations.

As more powerful LEDs are used in Traffic Light units, there is a need for a stable monitoring circuit. One object of the present invention is an improved circuit.

SUMMARY OF THE INVENTION

In accordance with the present invention, there is provided a sensor circuit for detecting a current supplied to a non-linear load and for producing a current reading dependent on a condition of operation of the non-linear load. U.S. Pat. Nos. 6,400,102 and 6,285,139, both entitled Non-Linear Light-Emitting Load Current Control is hereby incorporated by reference in their entirety.

The inventive LED module is a signal light, preferably used for a traffic light application. The module consists of a functional circuitry, an LED light source array and a monitoring circuit as shown in FIG. 1. The functional circuitry includes a switch mode power supply that converts the 120 $V_{ac}$ input voltage to an output constant current.

The light source is preferably made of a matrix of high-brightness LEDs. The matrix comprises LEDs connected in series and parallel, configured for redundancy.

The inventive monitoring circuit is made of a LED current detector circuit that senses the LED's current that is regulated by the PSU's feedback loop providing constant light flow.

The invention has the advantage of providing a current-representative signal that may be used for feedback control of a non-linear load. Current feedback control is difficult with current sensor circuits that do not provide an output that varies with the condition of operation of the non-linear load. The invention described herein provides this feature in a simple low-cost circuit.

The present invention also relates to a substantially constant intensity light source comprising:
a) a non-linear light-emitting load; and
b) a controllable dc voltage and current source for supplying the non-linear light-emitting load with dc voltage and current; preferably the controllable source is a switching power supply.

The objects, advantages and other features of the present invention will become more apparent upon reading of the following non-restrictive description of a preferred embodiment thereof, given by way of example only with reference to the accompanying drawings.

DETAILED DESCRIPTION OF THE PREFERRED EMBODIMENT

The inventive current sensing circuit is preferably used with signal lights for traffic lights. Preferably each signal light is made up of a matrix of high brightness LEDs connected in series and parallel and configured for redundancy.

Although the preferred embodiment of the present invention will be described with reference to a current sense circuit used with LED lamps, it should be understood that this example is not intended to limit the range of applications of the present invention.

The inventive circuitry module includes functional circuitry, an LED light source array connected in series and parallel and configured for redundancy and a monitoring circuit. The functional circuitry preferably includes a switch mode power supply that converts 120 volts ac input voltage to an output constant current. For yellow LEDs, the output current is 900 mA. For red LEDs, the current output is 590 mA at 25° C. and 800 mA at 74° C. for green LEDs, the current output is 660 mA at 25° C. and 670 mA at 74° C. The monitoring circuit is made of an LED current detector circuit that senses the LED's current. The LED's current is regulated by the power supply unit (PSU) feedback loop providing constant light flow.

The present invention preferably utilizes a substantially constant intensity light source comprising: a non-linear light-emitting load; and a controllable dc voltage and current source for supplying the non-linear light-emitting load with dc voltage and current. Preferably the controllable source is a switching power supply.

The inventive circuit provides a current-representative signal that may be used for feedback control of a non-linear load. Current feedback control is difficult with current sensor circuits that do not provide an output that varies with the condition of operation of the non-linear load. The invention described herein provides this feature in a simple low-cost circuit.

Figure 1:
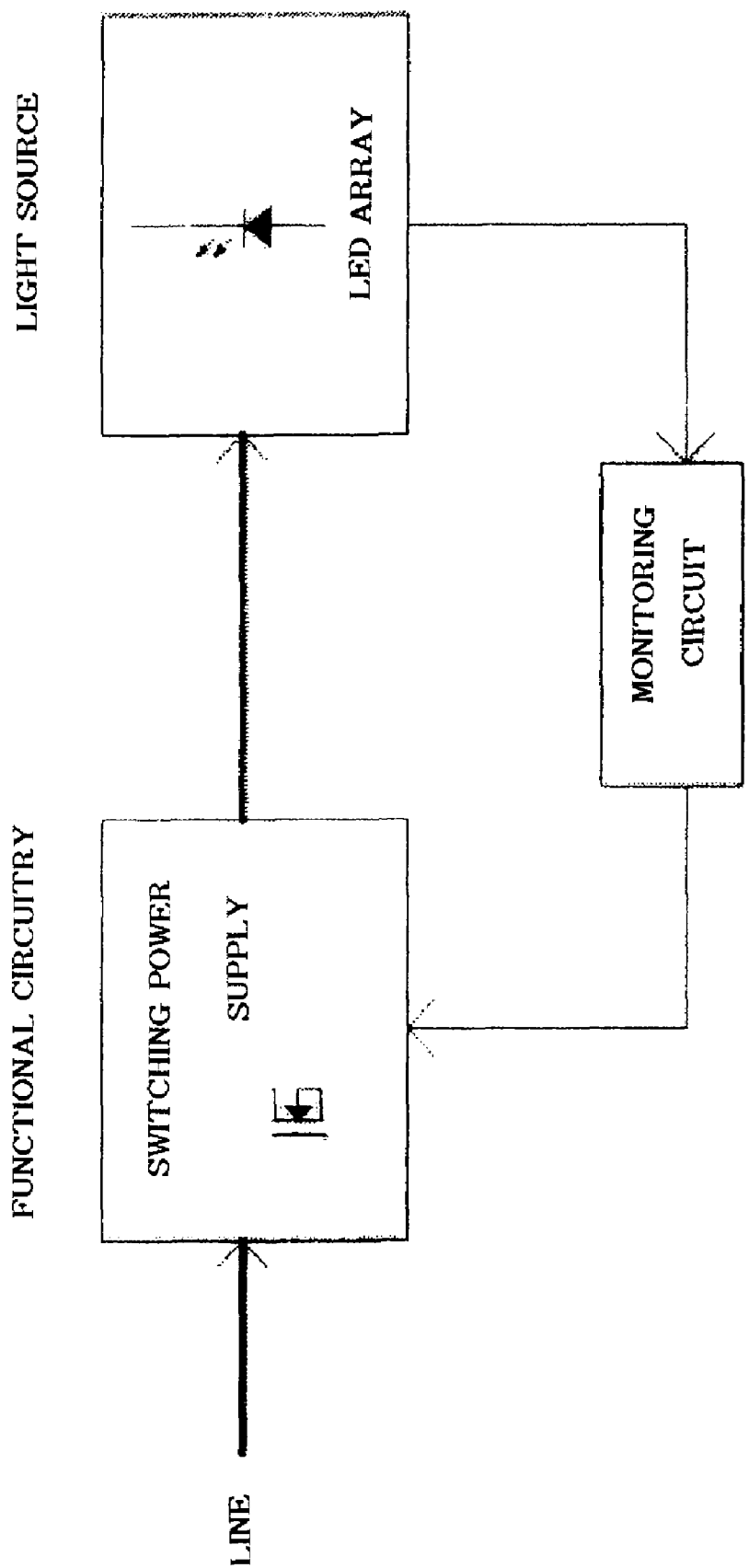
FIG. 1 is a block diagram of an LED traffic light.
Figure 2:
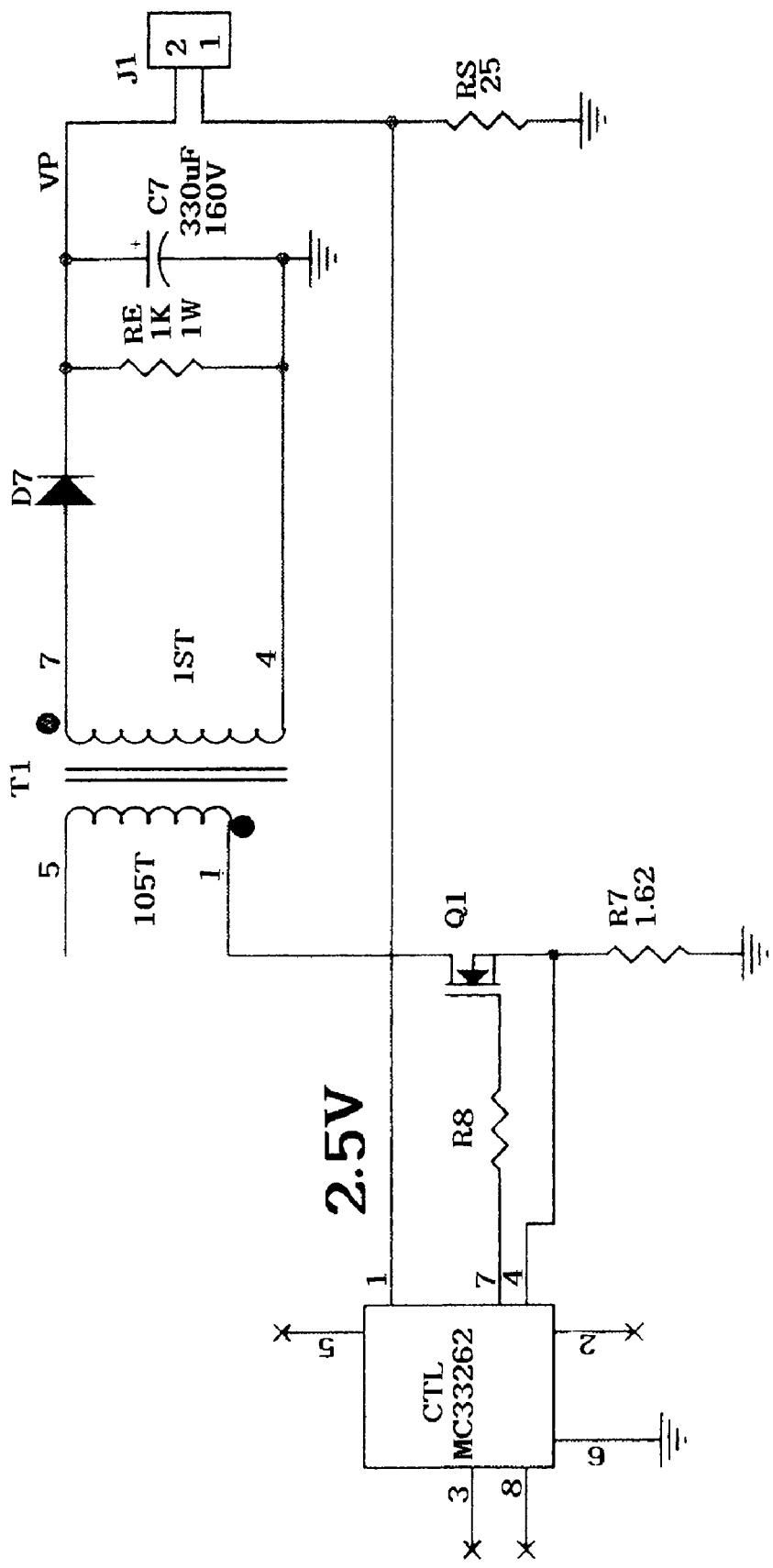
FIG. 2 is a prior art current sense circuit.
Figure 3:
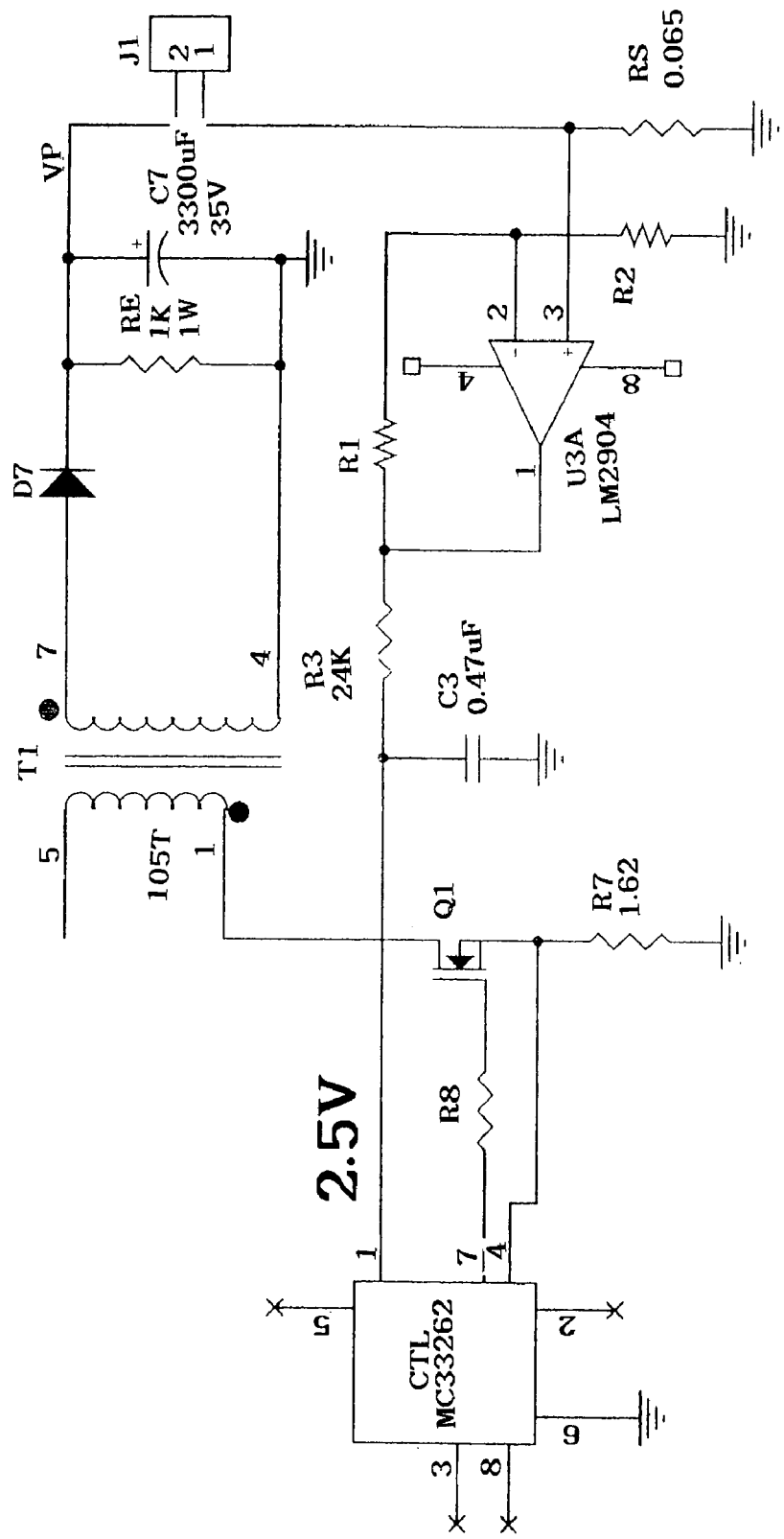
FIG. 3 is a prior art current sense circuit.
Figure 4:
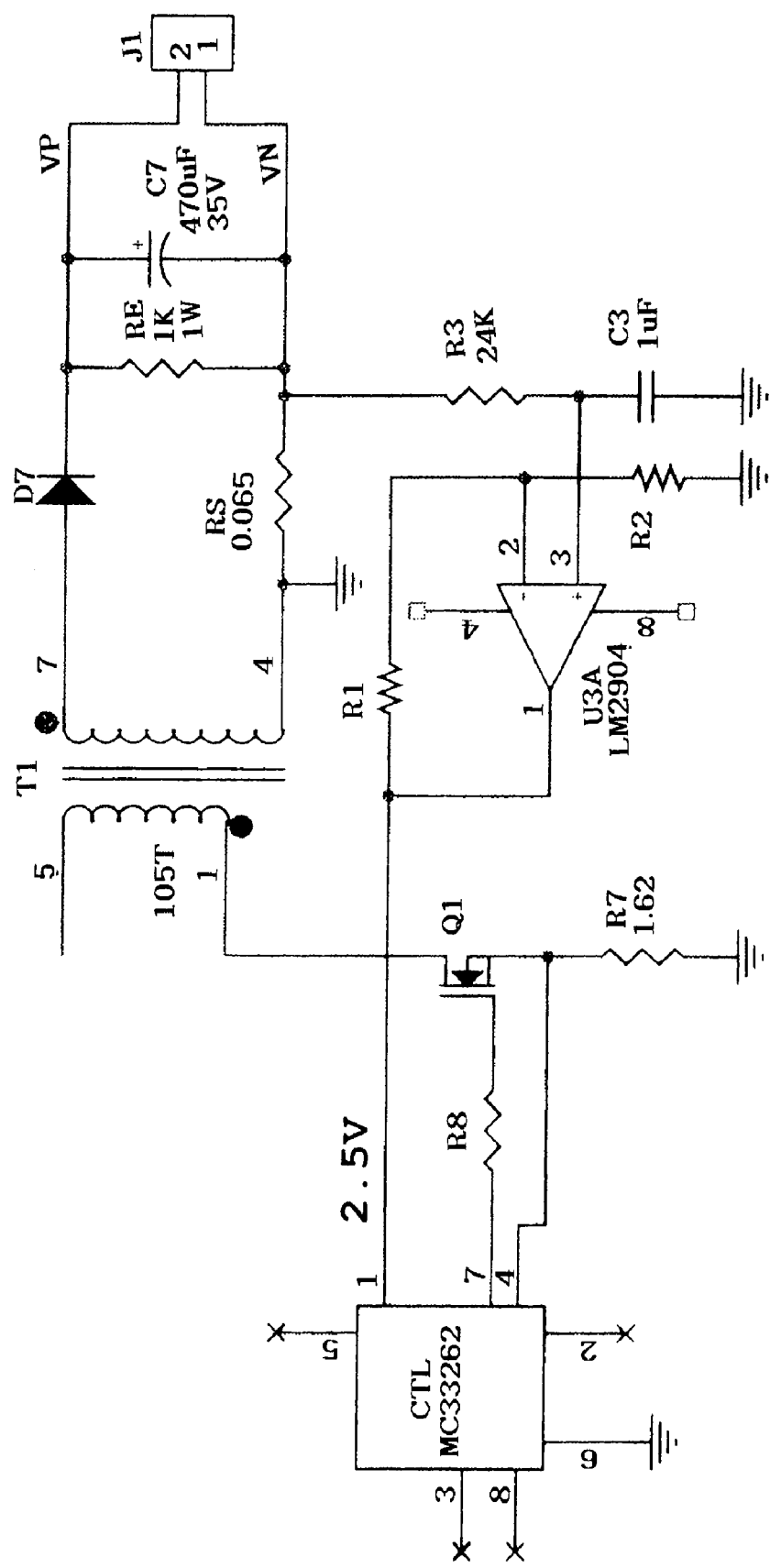
FIG. 4 is one embodiment of a current sense circuit.

FIG. 4 shows an improved method and circuit to sense the load current and will overcome the drawbacks of the prior art circuits. The inventive circuit senses the current of the flyback diode D7 and recovers the dc component of the waveform via low pass filter R3/C3 (7 Hz). A small current sense transformer may be used in place of $R_S$ for higher load current applications. Based on the circuit shown in FIG. 2, the pole C7/$R_{load}$ changes with different load current and the voltage ripple across $R_S$ changes for any variation of C7 (both initial and temperature variations). As shown in FIG. 4, R3/C3 provides a pole that is independent of the pole C7/$R_{load}$ variations. The voltage ripple across C3 is completely independent of capacitor C7. C3 is preferably a X7R ceramic capacitor and has lower initial and temperature variations in comparison of the electrolytic capacitor C7. The turn-on and turn-off of the lamp is also improved since capacitance value of C7 can be much smaller, 470 uF instead 3,300 uF for a 1A load.

A detailed view of the current sense amplifier is shown in FIGS. 5–8. That circuit allows for the selection of the current for the yellow, red or green LED configuration. The yellow, green or red current is selected by connecting the jumper at position 1–2, 3–4 or 5–6, respectively.

It also provides a minimum current setting if the jumper is removed. This circuit compensates for the light reduction of the red and green LEDs at higher temperature by increasing the output current. This compensation is performed by thermistor $R_{th}$ where its resistivity decreases above 25° C., reducing the Op Amp gain and thus increasing the current across $R_S$. The resistance is 25 KΩ at 25° C. and 3.8 KΩ at 74° C. Moreover, only one (1) thermistor is used for all the load configurations.

Figure 5:
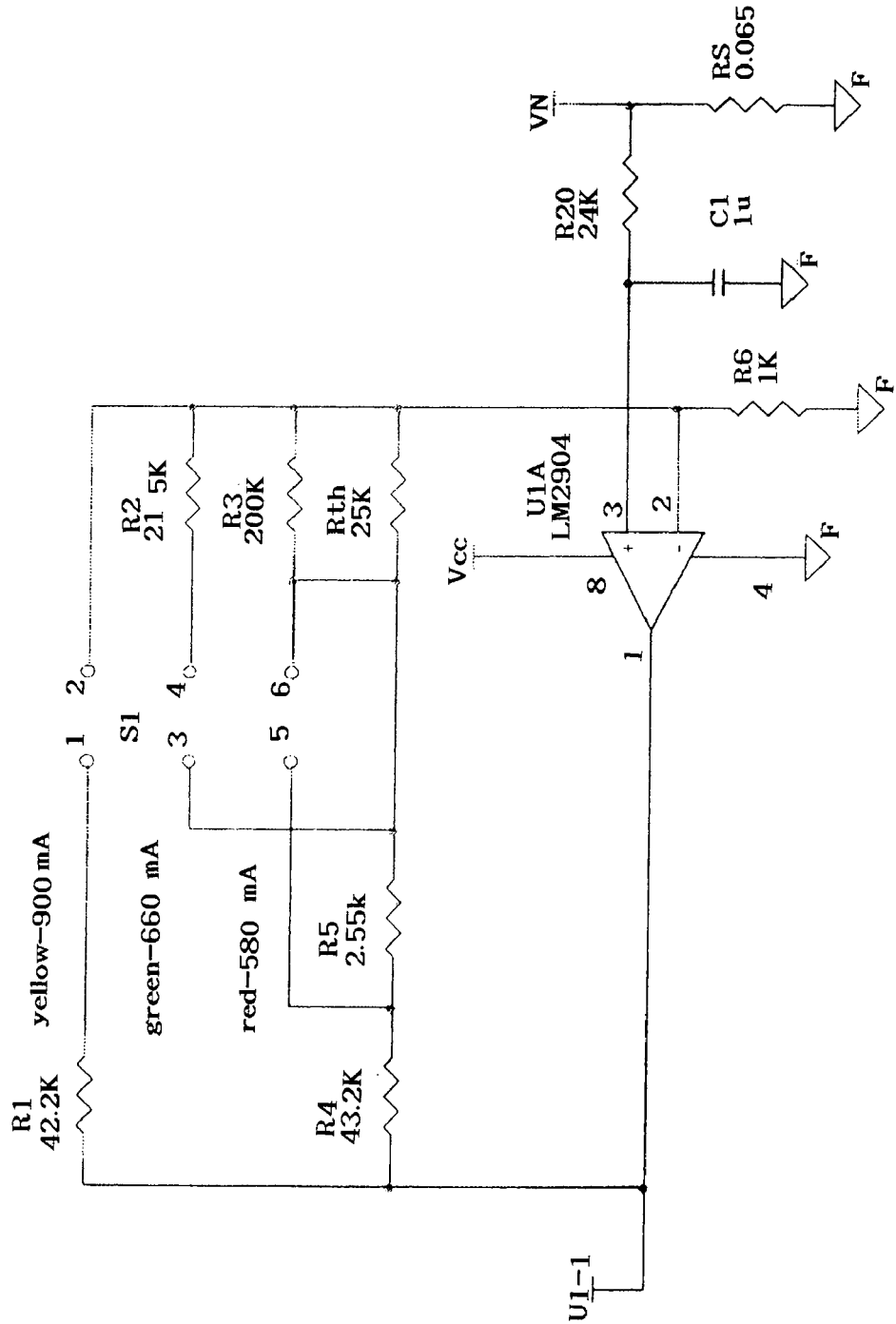
FIG. 5 is an embodiment of a current sense amplifier circuit.
Figure 6:
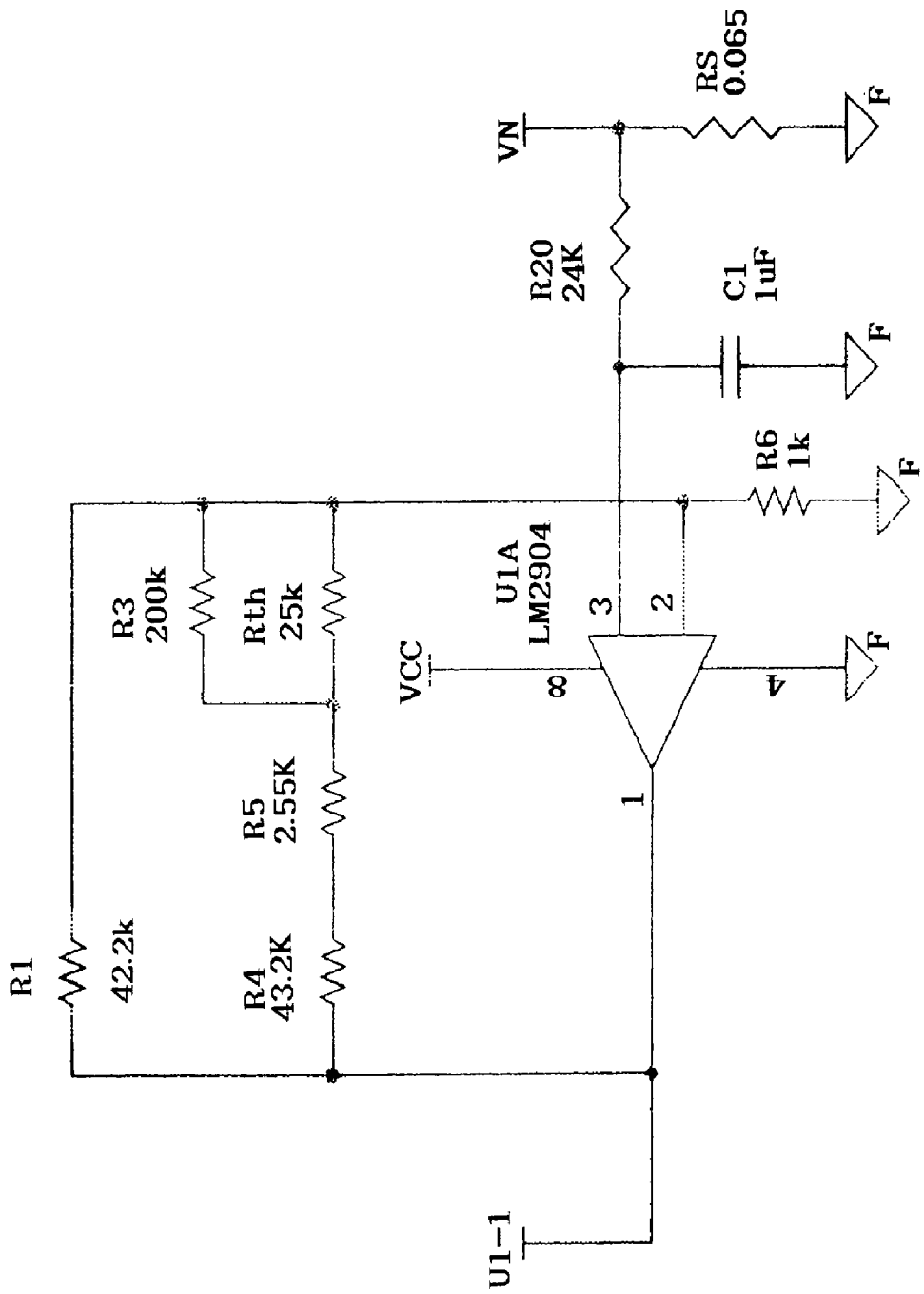
FIG. 6 is a current sense amplifier configured for a matrix of yellow LEDs.
Figure 7:
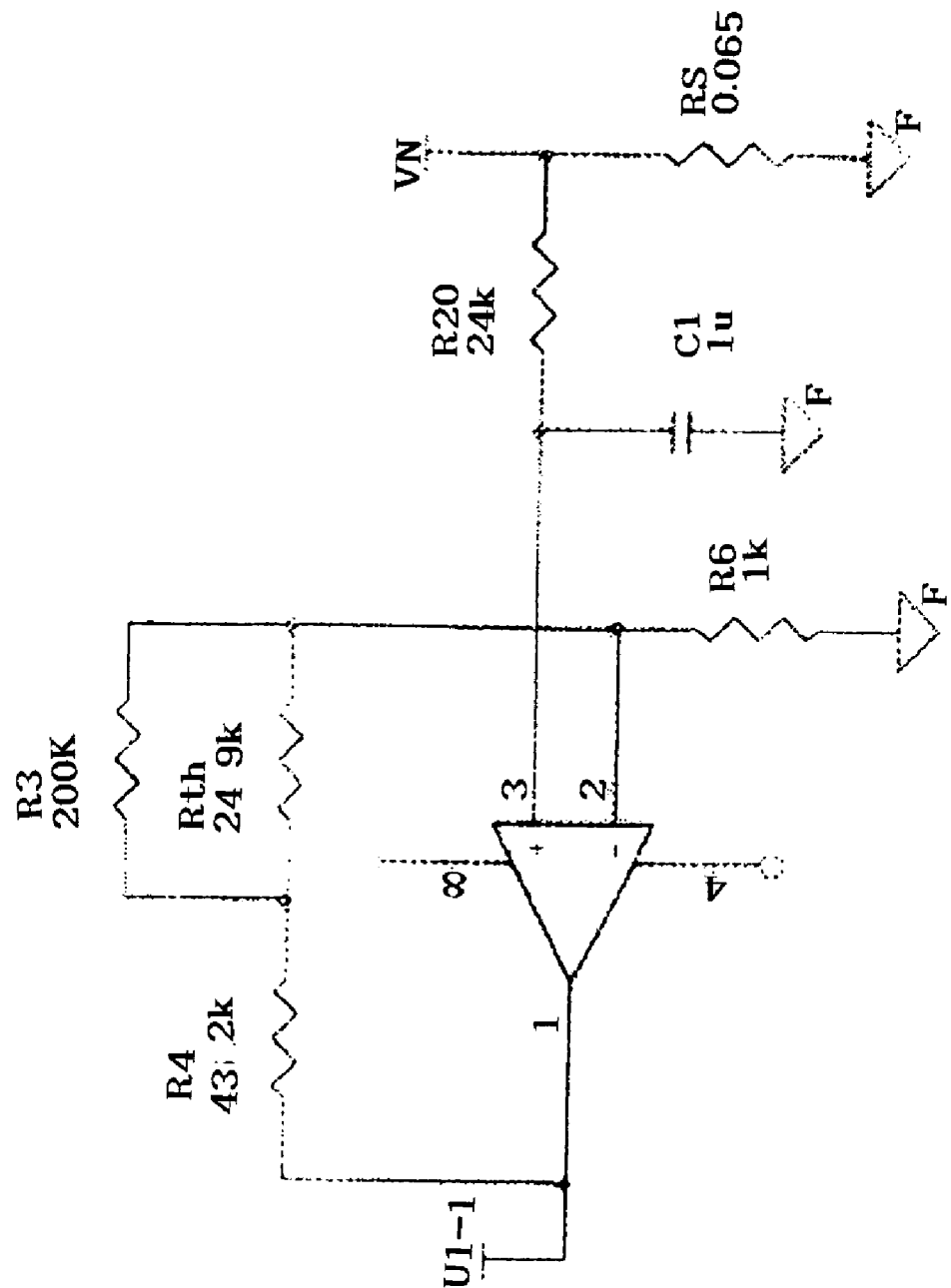
FIG. 7 is a current sense amplifier configured for a matrix of red LEDs.
Figure 8:
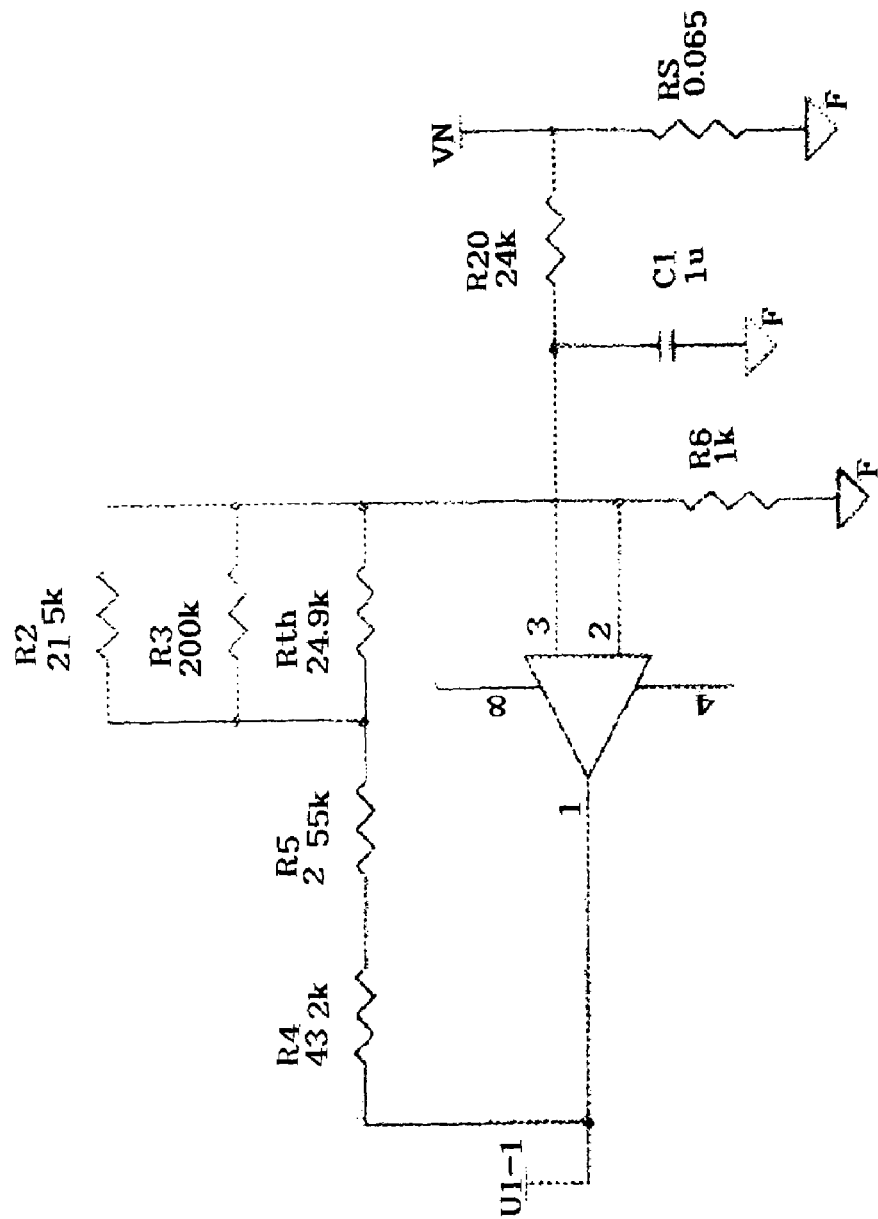
FIG. 8 is a current sense amplifier configured for a matrix of green LEDs.

For yellow signal, red signal or green signal applications, the jumper is connected at S1-1 and 2, S1-3 and 4, or S1-5 and 6, respectively, as shown in FIG. 5. The equivalent current sense circuit for a yellow signal, red signal or green signal is shown in detail in FIG. 6, FIG. 7 and FIG. 8, respectively. The current across the yellow, a red or green LED matrix changes as the ambient temperature changes. At steady state, the voltage at U1-1 is 2.5 Vdc. The average voltage across RS is kept constant and is equal to V_RS=2.5/(1+Rfb/R6). Notice that the low-pass filter components R20 & C1 has a pole at 6.3 Hz. The voltage across C1 is the average voltage across RS and a small amount of the 120 Hz ac component (V_C1_ac=6.3 Hz/120 Hz*V_RS_ac).

The following equations are used to determine the component value for the red signal. Similarly, the component value for the green and yellow signals can be found:

Feedback Resistor @ 25 deg C.:

$$\text{Rfb\_red\_25} := \left(\frac{2.5}{\text{I\_red\_25} - \text{RS}} - t\right) \cdot \text{R6}$$

Rfb__red__25 = 65.313 KΩ

Feedback Resistor @ 74 deg C.:

$$\text{Rfb\_red\_74} := \left(\frac{2.5}{\text{I\_red\_74} - \text{RS}} - 1\right) \cdot \text{R6}$$

Rfb__red__74 = 47.077 KΩ

Required temperature coefficient conversion:

$$k74 := \frac{\text{Rfb\_red\_74}}{\text{Rfb\_red\_25}}$$

k74 = 0.721 . . .
such ratio does not exist k74 := 0.1532 . . . selected from curve 1

-continued

Minimum Thermistor Value:

$$Rth\_min := \frac{Rfb\_red\_25 - Rfb\_red\_74}{1 - k74}$$

$Rth := 24.9 \cdot K\Omega \ldots$ select $Rth\_min = 21.535 \ K\Omega$

Quadratic Equation Parameters:

$a := 1$
$b := -(Rfb\_red\_25 + Rfb\_red\_74)$
$c := Rfb\_red\_25 \cdot Rfb\_red\_74 - \dfrac{Rfb\_red\_25 - Rfb\_red\_74}{\dfrac{1}{Rth} \cdot \left(\dfrac{1}{k74} - 1\right)}$ $a = 1$
$b = -1.124 \times 10^5$
$c = 2.993 \times 10^9$ Compute series resistor:

$$R4 := \frac{-b - \sqrt{b^2 - 4 \cdot a \cdot c}}{2 \cdot a}$$

$R4 := 43.2 \cdot K\Omega$ select $R4 = 43.338 \ K\Omega$

Compute parallel resistor:

$$R3 := \left(\frac{1}{Rfb\_red\_25 - R4} - \frac{1}{Rth}\right)^{-1}$$

$R3 := 200 \cdot K\Omega \ldots$ select $R3 = 197.565 \ K\Omega$

Check Current @ 25 deg C.:

$$Rfb\_25 := R4 + \frac{R3 \cdot Rth}{R3 \mid Rth}$$

$$I\_red\_25 := \frac{2.5}{\left(1 + \dfrac{Rfb\_25}{R6}\right) \cdot RS}$$

$I\_red\_25 = 0.58 \ A$

Check Current @ 75 deg C.:

$$Rfb\_74 := R4 + \frac{R3 \cdot Rth \cdot k74}{R3 + Rth \cdot k74}$$

$$I\_red\_74 := \frac{2.5}{\left(1 + \dfrac{Rfb\_74}{R6}\right) \cdot RS}$$

$I\_red\_74 = 0.802 \ A$

The objects, advantages and other features of the present invention will become more apparent upon reading of the following non-restrictive description of a preferred embodiment thereof, given by way of example only with reference to the accompanying drawings.

The invention claimed is:

1. A substantially constant intensity light source, comprising:
   functional circuitry, said functional circuitry comprising a switching power supply;
   at least one signal, said signal a matrix of LEDs connected in series and parallel and configured for redundancy; and
   a monitoring circuit, said monitoring circuit comprises a current sense circuit;
   wherein said current sense circuit includes an amplifier and at least one resistor in series with the amplifier and a power converter circuit, senses a current of a flyback diode, recovers a dc component of a waveform via a low pass filter, and provides feedback control of the at least one signal.

2. The light source of claim 1, wherein the power converter circuit includes a current sense transformer.

3. The light source of claim 1, wherein the current sense circuit further comprises a pole that is independent of pole $C7/R_{load}$ variations.

4. The light source of claim 3, wherein voltage ripple across a first capacitor in the amplifier is independent of a second capacitor in the power converter circuit.

5. The light source of claim 4, wherein the second capacitor is less than 500 µF.

6. The light source of claim 1, wherein the LEDs are selected from a group consisting of red LEDs, green LEDs or yellow LEDs.

7. The light source of claim 1, further comprising a first signal comprising a matrix of red LEDs connected in series and parallel and configured for redundancy, a second signal comprising a matrix of yellow LEDs connected in series and parallel and configured for redundancy, and a third signal comprising a matrix of green LEDs connected in series and parallel and configured for redundancy.

8. The light source of claim 1, wherein the amplifier increases an output current to compensate for light reduction of LEDs at higher temperatures.

9. The light source of claim 1, wherein the amplifier comprises a thermistor and at least one resistor having a resistivity that decreases above 25° C.

10. The light source of claim 1, wherein an amplifier gain is reduced and a current across a resistor Rs is increased.

11. The light source of claim 6, wherein the LEDs are yellow and the amplifier is connected in parallel with a first, a second, a third, a fourth, and a fifth resistor, and the first resistor is connected in parallel with the second, the third, the fourth and the fifth resistors, the second, the fourth and the fifth resistors are connected in series, the third resistor is connected in parallel with the second resistor and a capacitor and a resistor Rs are connected in series with the amplifier.

12. The light source of claim 6, wherein the LEDs are red and the amplifier is connected in parallel with a first, a second and a third resistor and the first resistor is connected in parallel with the third resistor and in series with the second resistor and the second capacitor and a resistor Rs are connected in series with the amplifier.

13. The light source of claim 6, wherein the LEDs are green and the amplifier is connected in parallel with a first, a second, a third, a fourth and a fifth resistor, the first resistor is connected in series with the second and the fourth resistor and in parallel with the third and the fifth resistor and the second capacitor and a resistor Rs are connected in series with the amplifier.

* * * * *